United States Patent
Bathon et al.

[11] Patent Number: 5,988,675
[45] Date of Patent: Nov. 23, 1999

[54] PASSENGER-SIDE AIRBAG MODULE

[75] Inventors: Michael Bathon, Stockstadt; Stefen Fäth, Aschaffenburg; Stefan Bohn, Goldbach, all of Germany

[73] Assignee: TRW Automotive Safety Systems GmbH, Aschaffenburg, Germany

[21] Appl. No.: 09/014,479

[22] Filed: Jan. 28, 1998

[30] Foreign Application Priority Data

Feb. 15, 1997 [DE] Germany .......................... 197 05 830

[51] Int. Cl.⁶ .................................................. B60R 21/20
[52] U.S. Cl. ....................................... 280/732; 280/743.1
[58] Field of Search ................................... 280/731, 732, 280/743.1, 743.2

[56] References Cited

U.S. PATENT DOCUMENTS

| | | | |
|---|---|---|---|
| 5,004,266 | 4/1991 | Miller et al. | 280/743.2 |
| 5,242,192 | 9/1993 | Prescaro et al. | 280/732 |
| 5,306,039 | 4/1994 | Nakayama | 280/732 |
| 5,732,971 | 3/1998 | Lutz | 280/732 |
| 5,755,459 | 5/1998 | LaLonde | 280/743.1 |

FOREIGN PATENT DOCUMENTS

4137691 A1 11/1992 Germany .
19616941 C1 7/1997 Germany .

*Primary Examiner*—Kenneth R. Rice
*Attorney, Agent, or Firm*—Sprung Kramer Schaefer & Briscoe

[57] ABSTRACT

An airbag module for the passenger side of a vehicle with a diffusor pipe, a gas generator accommodated in and connected to the diffusor pipe, a folded-together air sack accommodated outside of and fastened to the diffusor pipe, a holder around the air sack, and cover components tensioned between a flange at one end of the gas generator or of a generator disk and the ends of the diffusor pipe and securely tensioning the edges of a loop that fits over the diffusor pipe and secures the air sack. The air sack around the holder essentially comprises a sack-like pouch of textile material around the diffusor pipe with two partly overlapping pieces attached to and detachable from each other and concealing the opening that the unfolding air sack emerges through.

8 Claims, 3 Drawing Sheets

PASSENGER-SIDE AIRBAG MODULE

BACKGROUND OF THE INVENTION

The present invention concerns an airbag module for the passenger side of a vehicle with a diffusor pipe, a gas generator accommodated in and connected to the diffusor pipe, a folded-together air sack accommodated outside of and fastened to the diffusor pipe, a holder around the air sack, and cover components tensioned between a flange at one end of the gas generator or of a generator disk and the ends of the diffusor pipe and securely tensioning the edges of a loop that fits over the diffusor pipe and secures the air sack.

The holder in the gas-sack unit known from German 4 137 691 A 1, which discloses most of the aforesaid features, comprises a shrunken-on flexible tube with a breakapart that rips open when the sack unfolds. This unit, however, satisfies only some of the requirements that will be discussed hereinafter.

In the set of components known from German 19 616 941 C 1 a web of material is wrapped around the diffusor pipe and extends to a cap that conceals the airbag module, demarcating the module along its longitudinal sides. Inconvenient here is that the module absolutely must include the concealing cap, and passenger-side airbag modules of this genus cannot be employed when a customer wants to use the cap with another prefabricated assembly like an instrument panel for example.

Rapidly inflatable "pillows" called airbags are currently part of the standard equipment in automobiles. Explosion-like combustion accompanied by the generation of gas is triggered by a pyrotechnical fuse, and/or compressed gas released, in response to an electronically detected deceleration signal, and the folded-together airbag is inflated within 20 to 60 milliseconds, becoming an air-filled pillow that prevents the passenger from striking the surrounding parts of the automobile hard, at least in the direction of acceleration, once an impact occurs and a prescribed critical deceleration has been detected and the ignition is released.

Contemporary vehicles leave space in the bodywork for the module, which comprises the folded-together airbag, the gas generator, and the fuse. The space is usually concealed behind a cover that matches the interior of the vehicle. The cover does not impede the emergence of the rapidly inflated airbag. There are two prerequisites for such a module.

First, it must have fasteners for fastening it behind the cover and in its accommodation. Second, it must be accommodated protected during storage, shipment, assembly, installation, and ordinary stress over the life of the vehicle.

To satisfy the aforesaid demands, a number of housings and similar structures have also been proposed. These perform the aforesaid functions well enough although most of them are far too complicated and in particular relatively heavy as well. The known housings are as a rule made of metal or plastic, and a lot of attention is devoted not only to securely fasten the airbag, made of non-ripping textile, into the housing but also to provide the latter with fasteners that allow it to be securely fastened to the bodywork at the site of installation. Such housings are often not acceptable for contemporary vehicle manufacture from the aspects of efficiency, economy, and ecology. There is accordingly a need to protect airbag modules as hereintofore described while conserving as much material and weight as possible and while keeping them clean and undamaged in any way.

SUMMARY OF THE INVENTION

This object is attained in an airbag module of the aforesaid genus in accordance with the present invention characterized in that the air sack around the holder essentially comprises a sack-like pouch of textile material around the diffusor pipe with two partly overlapping pieces attached to and detachable from each other and concealing the opening that the unfolding air sack emerges through.

This concept is based on the awareness that the space left in the bodywork has by now been improved to the extent that the airbag module no longer absolutely needs to be completely enclosed, aside from the opening it emerges through, in a rigid housing or inherently strong holder in order to reliably attain the aforesaid protective functions.

All that is really necessary is to ensure that the once manufactured airbag module will be protected during storage, shipping, assembly, and installation to the extent that it cannot be damaged. Once installed, it will only need to be protected from the effects of dirt, temperature, and weather. It accordingly becomes possible in accordance with the present invention to make the walls of the holder extensively of a textile material, whereby the diffusor pipe with its gas generator and fuse can be adequately protected in a sack-like pouch. Using a textile material cuts down considerably on weight. Also important is that the type of concealment is appropriate for textile materials and requires no other materials. It will conceal the module well while readily moving out of the way when the airbag is ignited, the parts traveling forward in the direction the airbag unfolds along and releasing an exit of the appropriate dimensions.

Another advantage is the way the airbag is attached to the diffusor pipe, The edges at the ends of the pipe are simply tensioned in place by measures appropriate for a textile material. The attachment is uniformly stressed when the airbag ignites and will not be able to resist destruction.

Advantageous embodiments of the concept behind the present invention include a slit where one piece overlaps the other and by a tab with a narrow neck and a wide head integrated into the other piece, whereby the opening that the unfolding air sack emerges through can be loosely closed by inserting the tab through the slit, the tab comprising an essentially rectangular textile component connected to one end of the piece by way of a neck and folded into two or more layers secured together to produce a reinforced head, the cover components having flanges or similar structures to fasten the airbag module to the vehicle's bodywork, the cover components being secured to the diffusor pipe by a bent-down tab, the cover components extending laterally over at least the whole height of the folded-together air sack and over the rods or similar structures to the left and right of where the unfolding air sack emerges and are connected together, the pouch is provided with loops for stretching it around the diffusor pipe from one rod to the other rod, the cover components constituting in conjunction with the pouch tensioned between the rods a barrel for the unfolding air sack to shoot through and wherein, in addition to the cover components, two narrow rings tension edges of the air sack to the outside of the ends of the diffuser pipe. Embodiments will now be specific by way of example with respect to the drawings, wherein:

DETAILED DESCRIPTION OF THE INVENTION

Figure 1:
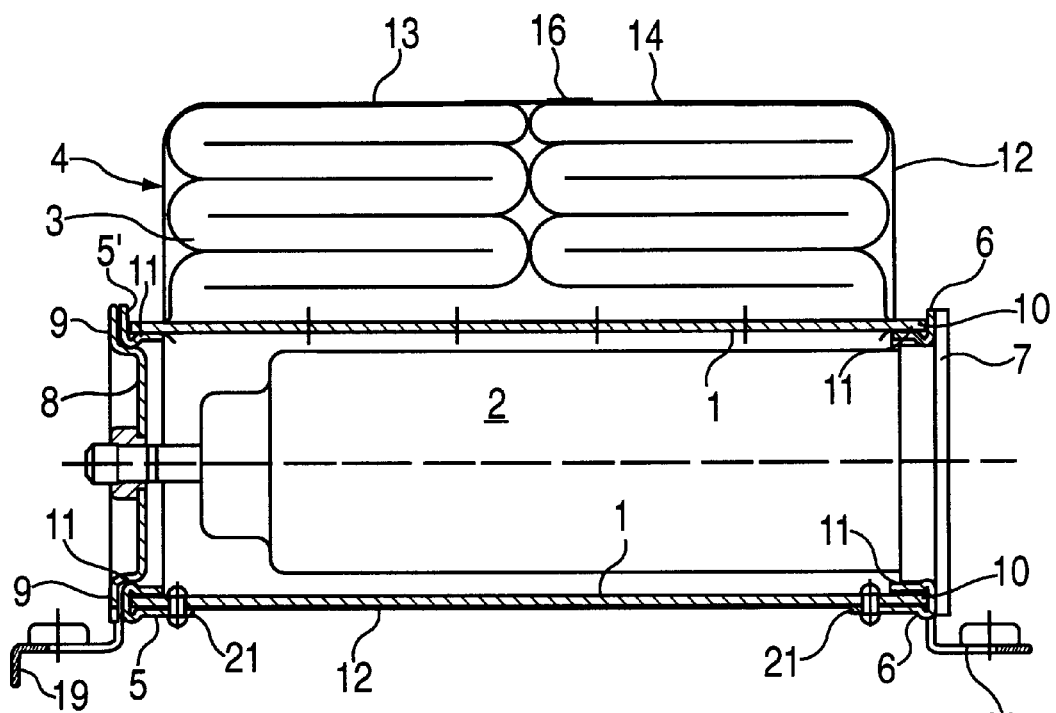
FIGS. 1 through 3 are a longitudinal section, a transverse section, and a larger-scale detail respectively, illustrating one embodiment of an airbag module in accordance with the present invention.
Figure 2:
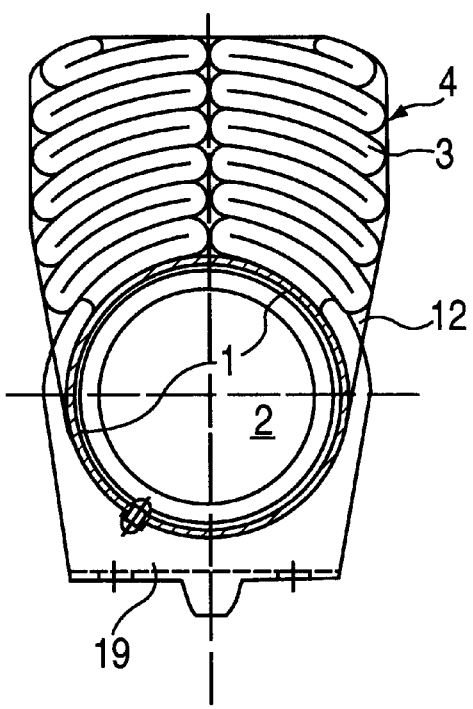
Figure 3:
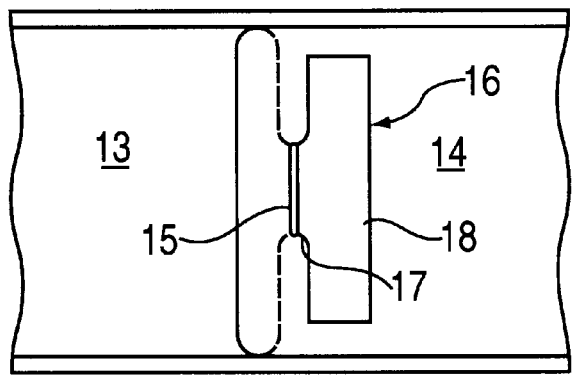

The airbag module for the passenger side of a motor vehicle illustrated in FIGS. 1 through 3 comprises a diffusor pipe 1, a gas generator accommodated in and connected to the diffusor pipe, an unillustrated fuse, a folded-together air sack 3 accommodated outside of and fastened to the diffusor pipe, a holder 4 around the air sack, and cover components 5 and 6 tensioned between a flange 7 at one end of the gas generator or of a generator disk 8 and the ends 9 and 10 of the diffusor pipe.

Air sack 3 is provided with a loop that fits over diffusor pipe 1 and secures the sack. The edges 11 of the loop are tensioned to the ends 9 and 10 of diffusor pipe 1, fastening air sack 3 to diffusor pipe 1 by simple means appropriate to textile materials. The holder 4 around the air sack 3 in accordance with the present invention essentially comprise a sack-like pouch 12 of textile material around the diffusor pipe 1, with two partly overlapping pieces 13 and 14 attached to and detachable from each other and concealing the opening that the unfolding air sack emerges through. Gas generator 2 is tensioned to diffusor pipe 1 by a flange 7 on one end of the generator and by a disk 8, forcing cover components 5 and 6 against the ends 9 and 10 of diffusor pipe 1 by a known procedure involving an unillustrated threaded connection to generate the force. Gas generator 2 is employed as a tension-subject component. Sack-like pouch 12 encloses, as will be particular evident for FIG. 2, both diffusor pipe 1 and the folded-together airbag 3 and is fastened where the airbag emerges by a slit-and-tab connection. Pieces 13 and 14 are for this purpose provided on pouch 12, folded over the folded-together airbag. A tab 16 with a narrow neck 17 and a wide head 18 is integrated into piece 13. Tab 16 can be inserted through a slit 15 in piece 14, constituting a detachable attachment for the folded-together air sack.

Cover components 5 and 6 are tensioned against diffusor pipe 1 along with the edges 11 of the securing loop and are provided with flanges 19 and 20 for securing the airbag module to the vehicle's bodywork. A bent-down tab 21 establishes cover components 5 and 6 along the circumference of diffusor pipe 1.

Figures 4, 5:
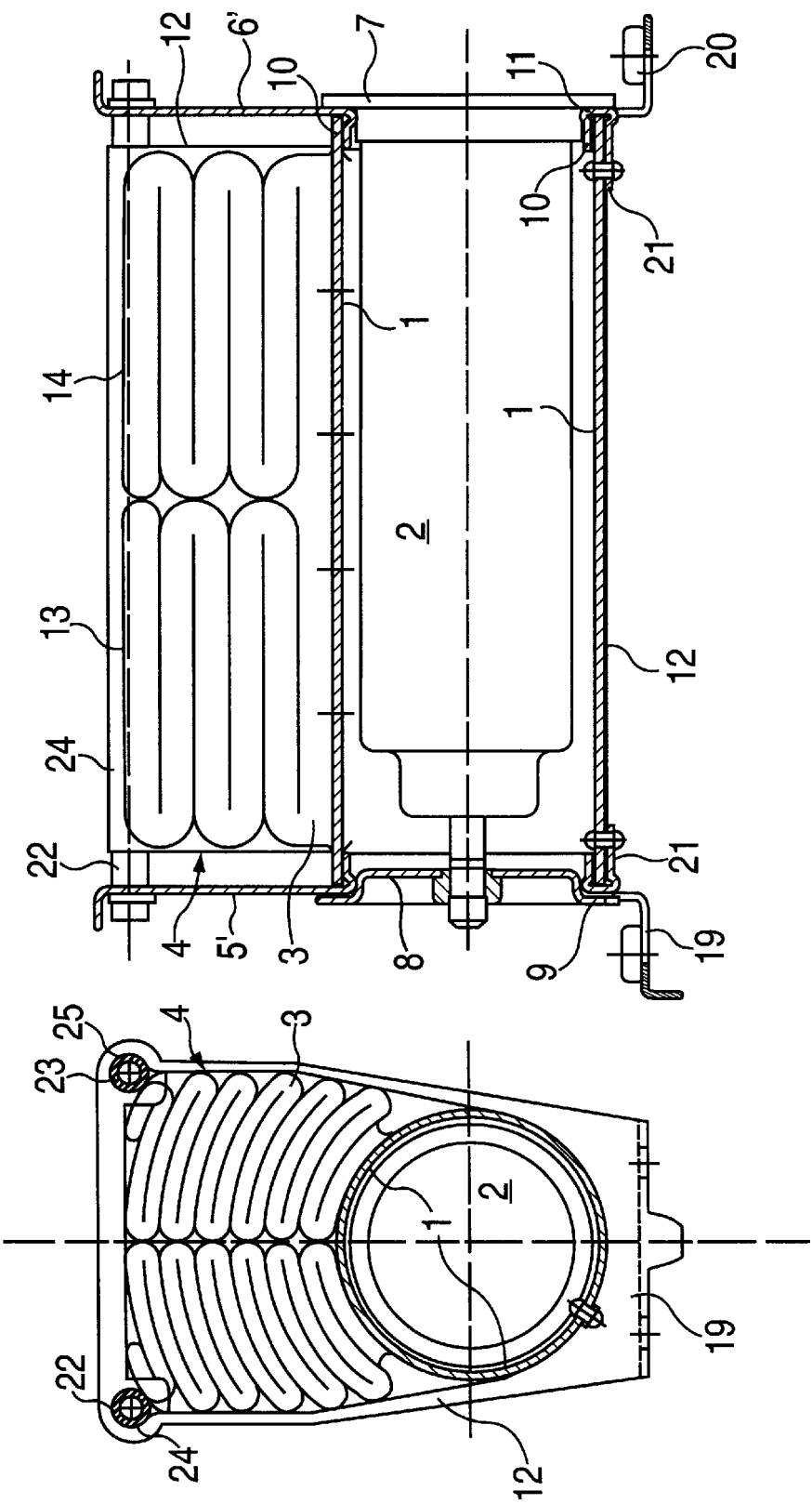
FIGS. 4 and 5 are a longitudinal section and a transverse section respectively through another embodiment.

The embodiments illustrated by way of example in FIGS. 4 and 5 differ from those illustrated in FIGS. 1 and 2 in that cover components 5 and 6 extend farther up beyond the height of folded-together air sack 3. This embodiment can include rods 22 and 23 or similar structures to the left and right of where the unfolding air sack 3 emerges if additional rigidity is desirable or necessary at the top of the module. In this event, pouch 12 can be provided with additional loops 24 and 25 surrounding or extending through rods 22 and 23 and secured to cover components 5' and 6'. Pouch 12 can then be stretched around diffusor pipe 1 from rod 22 to rod 23.

The specification of the parts illustrated in FIGS. 4 and 5 that do not differ from those illustrated in FIGS. 2 and 3 will not be repeated herein. It should, however, be noted that the opening that the unfolding air sack 3 emerges through in the embodiment illustrated in FIGS. 4 and 5 is exactly similar to the one in the embodiment illustrated in FIGS. 1 and 2 and in detail in FIG. 3.

Figure 6:
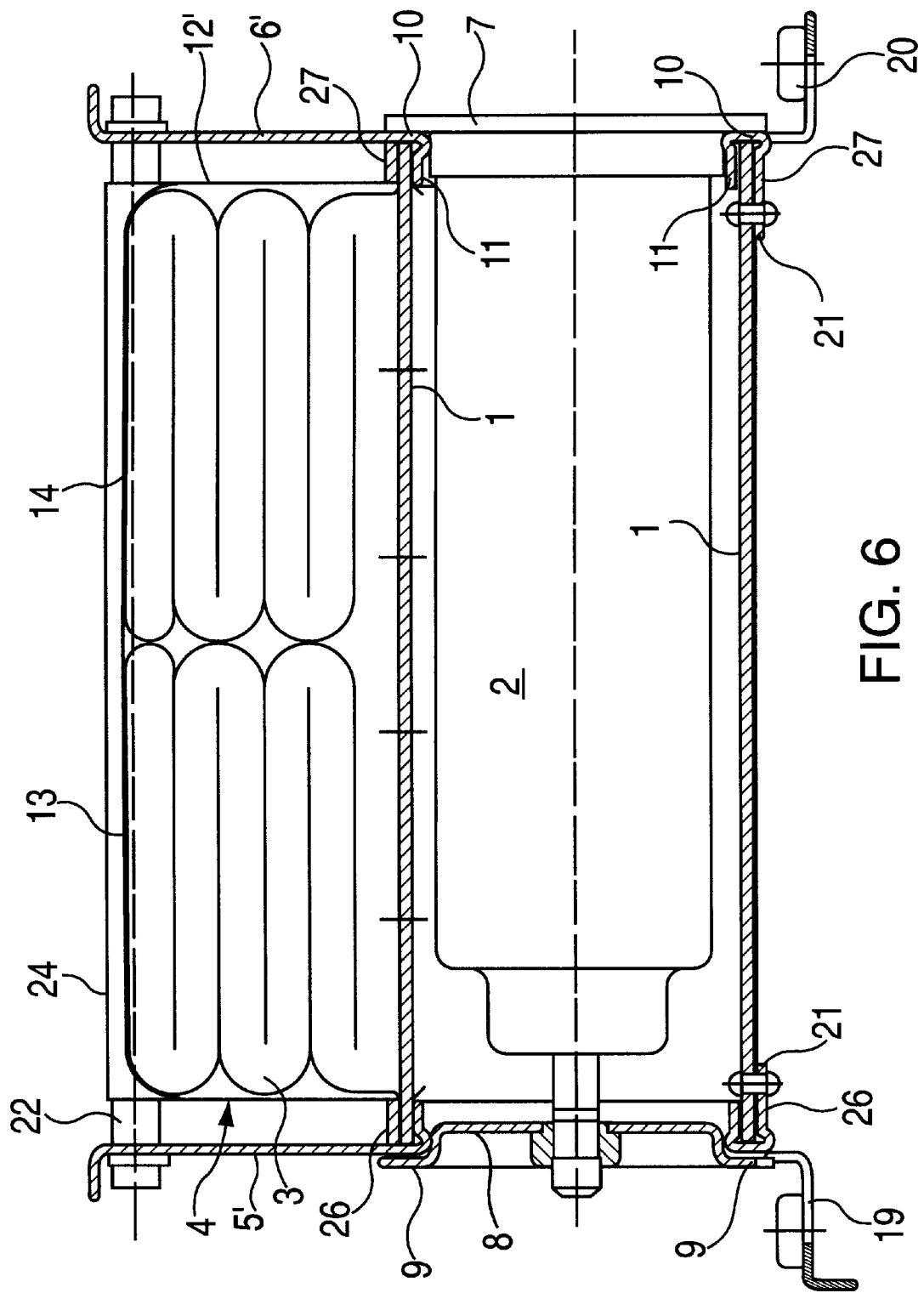
FIG. 6 is a longitudinal section through still another embodiment.

The embodiment illustrated in FIG. 6 differs from the one illustrate in FIGS. 4 and 5 only in two narrow rings 26 that tension the edges 11 of air sack 3 to the outside of the ends of diffusor pipe 1. This embodiment is to be employed if particularly powerful retaining forces are necessary when the airbag is ignited or if space and material are to be saved by providing only a narrow tensioning area.

All other parts are similar to those illustrated in FIGS. 1, 2, 3, and 4 and are labeled with the same reference numbers. They will not be further specified herein. The component that conceals the opening for the unfolding airbag to emerge through is of course similar to the one illustrated in FIG. 3.

What is claimed is:

1. An airbag module for the passenger side of a vehicle comprising a diffusor pipe, a gas generator accommodated in and connected to the diffusor pipe, a folded-together air sack accommodated outside of and fastened to the diffusor pipe, a holder around the air sack, and cover components tensioned between a flange at one end of the gas generator or of a generator disk and the ends of the diffusor pipe and securely tensioning the edges of a loop that fits over the diffusor pipe and secures the air sack, wherein the holder around the air sack essentially comprises a sack-like pouch of textile material around the diffusor pipe with two partly overlapping pieces attached to and detachable from each other and concealing the opening that the unfolding air sack emerges through.

2. The airbag module as in claim 1, further comprising a slit where one piece overlaps the other and a tab with a narrow neck and a wide head integrated into the other piece, whereby the opening that the unfolding air sack emerges through can be loosely closed by inserting the tab through the slit.

3. The airbag module as in claim 2, wherein the tab comprises an essentially rectangular textile component connected to one end of the piece by way of a neck and folded into two or more layers secured together to produce a reinforced head.

4. The airbag module as in claim 1, wherein the cover components have flanges or similar structures to fasten the airbag module to the vehicle's bodywork.

5. The airbag module as in claim 4, wherein the cover components are secured to the diffusor pipe by a bent-down tab.

6. The airbag module as in claim 1, wherein the cover components extend laterally over at least the whole height of the folded-together air sack and over the rods or similar structures to the left and right of where the unfolding air sack emerges and are connected together, and in that the pouch is provided with loops for stretching it around the diffusor pipe from one rod to the other rod.

7. The airbag module as in claim 6, wherein the cover components constitute in conjunction with the pouch tensioned between the rods a barrel for the unfolding air sack to shoot through.

8. The airbag module as in claim 1, wherein, in addition to the cover components, two narrow rings tension edges of the air sack to the outside of the ends of the diffuser pipe.

* * * * *